US008529692B2

(12) United States Patent
Hauk

(10) Patent No.: US 8,529,692 B2
(45) Date of Patent: Sep. 10, 2013

(54) HYDROPHOBIC BINDER MIXTURE, AND CONSTRUCTION MATERIALS MADE THEREFROM

(75) Inventor: Juergen Hauk, Freising (DE)

(73) Assignee: Baerlocher GmbH, Unterschleissheim (DE)

( * ) Notice: Subject to any disclaimer, the term of this patent is extended or adjusted under 35 U.S.C. 154(b) by 130 days.

(21) Appl. No.: 12/810,570

(22) PCT Filed: Dec. 15, 2008

(86) PCT No.: PCT/EP2008/010657
§ 371 (c)(1),
(2), (4) Date: Sep. 10, 2010

(87) PCT Pub. No.: WO2009/083129
PCT Pub. Date: Jul. 9, 2009

(65) Prior Publication Data
US 2011/0003925 A1    Jan. 6, 2011

(30) Foreign Application Priority Data

Dec. 27, 2007  (DE) ......................... 10 2007 062 773

(51) Int. Cl.
*C04B 11/00* (2006.01)

(52) U.S. Cl.
USPC .......................................... 106/778; 106/772

(58) Field of Classification Search
USPC ............................... 106/724, 772, 778
See application file for complete search history.

(56) References Cited

U.S. PATENT DOCUMENTS

| | | | |
|---|---|---|---|
| 2,082,887 A * | 6/1937 | Haydon | 106/661 |
| 3,009,820 A | 11/1961 | Gould | |
| 3,936,311 A | 2/1976 | Kirst | |
| 4,221,599 A | 9/1980 | Deleuil | |
| 4,235,794 A | 11/1980 | Rieber et al. | |
| 4,371,399 A | 2/1983 | May et al. | |
| 4,911,759 A * | 3/1990 | Ohi et al. | 106/665 |
| 5,169,967 A | 12/1992 | Assmus et al. | |
| 5,264,144 A | 11/1993 | Moroney | |
| 5,505,771 A * | 4/1996 | Chihara et al. | 106/35 |
| 5,702,828 A | 12/1997 | Adler et al. | |
| 5,855,667 A | 1/1999 | Thomas | |
| 6,547,874 B2 | 4/2003 | Eck et al. | |
| 6,699,339 B2 * | 3/2004 | Adler et al. | 156/39 |
| 7,410,538 B2 | 8/2008 | Butler et al. | |
| 7,594,963 B2 * | 9/2009 | Bonetto et al. | 106/778 |
| 7,718,019 B2 * | 5/2010 | Wittbold et al. | 156/39 |
| 2002/0045692 A1 | 4/2002 | Fiedler et al. | |
| 2006/0048684 A1 * | 3/2006 | Bonetto et al. | 106/772 |
| 2006/0254468 A1 | 11/2006 | Bastelberger et al. | |
| 2007/0173574 A1 | 7/2007 | Weitzel et al. | |
| 2008/0081853 A1 | 4/2008 | Bacher et al. | |

FOREIGN PATENT DOCUMENTS

| | | |
|---|---|---|
| DE | 2341085 | 3/1975 |
| DE | 2903515 | 8/1979 |
| DE | 2823002 | 6/1981 |
| DE | 3105407 | 9/1982 |
| DE | 3238390 | 5/1983 |
| DE | 32 42 598 | 5/1984 |
| DE | 3932377 | 12/1992 |
| DE | 4128424 | 3/1993 |
| DE | 4135117 | 4/1993 |
| DE | 41 07 385 | 2/1995 |
| DE | 44 33 864 | 2/1995 |
| DE | 19506398 | 8/1996 |
| DE | 19633131 | 2/1997 |
| DE | 69704312 | 9/2001 |
| DE | 100049072 | 4/2002 |
| DE | 10101190 | 8/2002 |
| DE | 10160130 | 6/2003 |
| DE | 10323205 | 12/2004 |
| DE | 10351259 | 6/2005 |
| DE | 60108152 | 12/2005 |
| DE | 102004026610 | 12/2005 |
| DE | 102004059377 | 6/2006 |
| DE | 196 28 749 | 6/2007 |
| EP | 0054175 | 6/1982 |

(Continued)

OTHER PUBLICATIONS

EP 000054175 A1 Ziche et al. (Jun. 23, 1982) abstract only.*
European Search Report, dated Mar. 14, 2011, received from the European Patent Office in corresponding European application No. 08 868 209.1.
International Search Report mailed Jun. 22, 2009 in corresponding International Application No. PCT/EP2008/010657, 6 pages.
International Preliminary Report on Patentability, mailed Aug. 19, 2010 in corresponding International Application No. PCT/EP2008/010657, 15 pages.

(Continued)

Primary Examiner — Paul Marcantoni
(74) Attorney, Agent, or Firm — Meunier Carlin & Curfman, LLC

(57) ABSTRACT

The invention relates to a mixture of a calcium sulfate-based mineral binder and at least one additive that imparts hydrophobic properties to the calcium sulfate-based mineral binder. Said additive is a salt, a hydrophilic fatty acid, or a binder mixture containing fatty acid salts. The content of fatty acid salts of fatty acids that have 8 to 17 C atoms amounts to at least 20 percent by weight relative to the total amount of fatty acid salts in the fatty acid salt mixture, or the content of fatty acids that have 8 to 14 C atoms amounts to at least 10 percent by weight relative to the total amount of fatty acid salts in the fatty acid salt mixture, or both. The construction materials according to the invention can be gypsum boards, gypsum blocks, or other molded parts, especially gypsum plasterboards.

29 Claims, No Drawings

(56) References Cited

FOREIGN PATENT DOCUMENTS

| | | |
|---|---|---|
| EP | 0210842 | 2/1987 |
| EP | 0351521 | 8/1993 |
| EP | 1328486 | 12/2004 |
| EP | 1547987 | 3/2006 |
| GB | 223153 | 10/1924 |
| GB | 1336120 | 11/1973 |
| GB | 535739 | 4/1994 |
| GB | 2343448 | 12/2002 |
| JP | 61021989 | 1/1986 |
| JP | 02142880 | 5/1990 |
| JP | 09087687 | 3/1997 |
| JP | 10330786 | 1/1998 |
| JP | 10139510 | 5/1998 |
| JP | 2006225214 | 8/2006 |
| WO | 9107362 | 5/1991 |
| WO | 93/04009 | 3/1993 |
| WO | 0023393 | 4/2000 |
| WO | 2004/103928 | 12/2004 |

OTHER PUBLICATIONS

Chemical Abstract, Bd. 105, Nr. 6, 11, Saito, K, "Concrete Waterproofing Agent," Abstract No. 47964, p. 321 (Aug. 11, 1986).
International Preliminary Report on Patentability, mailed Jun. 29, 2012, in International Patent Application No. PCT/EP2008/01656.
European Search Report dated Mar. 14, 2011, received from the European Patent Office in European Application No. 08 875 087.2.
International Search Report mailed May 12, 2009, in International Patent Application No. PCT/EP2008/010656.
International Search Report mailed Jun. 30, 2009, in International Patent Application No. PCT/EP2008/010657.
International Preliminary Report on Patentability, mailed Aug. 10, 2010, in International Patent Application No. PCT/EP2008/010656 (translation). Done.
International Preliminary Report on Patentability, mailed Jun. 29, 2010, in International Patent Application No. PCT/EP2008/010657. Done.
Copending U.S. Appl. No. 12/810,590.

\* cited by examiner

HYDROPHOBIC BINDER MIXTURE, AND CONSTRUCTION MATERIALS MADE THEREFROM

FIELD

The invention provides a mixture of a mineral binder based on calcium sulfate and at least one additive which imparts hydrophobic properties to the mineral binder based on calcium sulfate, this additive being a salt, a hydrophilic fatty acid or a binder mixture which comprises fatty acid salts, the proportion of the fatty acid salts of fatty acids having 8 to 17 carbon atoms, based on the total amount of the fatty acid salts in the fatty acid salt mixture, amounting to 20% by weight or more than 20% by weight, or the proportion of fatty acids having 8 to 14 carbon atoms amounting to 10% by weight or more than 10% by weight, based on the total amount of the fatty acid salts in the fatty acid salt mixture, or both. Inventive construction materials which are obtainable from an inventive binder mixture may, for example, be gypsum slabs, gypsum blocks or other components, especially gypsum plasterboards.

BACKGROUND

In the production of gypsum products, especially in the production of gypsum moldings and construction materials obtainable therefrom, such as gypsum plasterboards, it is frequently necessary to improve water resistance. For this purpose, according to the prior art, the gypsum moldings are frequently rendered water-repellent. This can be done, for example, by applying a hydrophobic coating to a corresponding molding, for example by treatment with hydrophobing agents, or else by a so-called bulk hydrophobization, in which an appropriate hydrophobing agent is added to the gypsum constituents.

Hydrophobing additives for gypsum described in the prior art are a multitude of different materials.

For example, DE 100 49 072 A1 describes construction materials which comprise carboxylic ester-containing hydrophobing powders. According to the publication, the hydrophobing powder used is a redispersible dispersion powder which contains at least one carboxylic ester. A problem with the compositions described is that the hydrophobization is frequently not sufficiently effective and, furthermore, the carboxylic esters may be subjected to a hydrolysis process which alters the effect over time.

U.S. Pat. No. 6,547,874 B2 relates to a hydrophobing agent for gypsum-containing construction materials which comprise constituents treated with organopolysiloxanes. The use of siloxanes in the hydrophobization of gypsum-containing construction materials leads, however, in practice frequently to problems in the recycling of corresponding materials. Furthermore, setting a predefined or desired porosity is frequently made more difficult, since the silicones can act antagonistically to those compositions which are intended to impart porosity to the gypsum by inclusion of air. Furthermore, the use of corresponding silicones have the disadvantage that the materials are expensive and in some cases difficult to obtain.

DE 41 07 385 C2 relates to a dry pulverulent render mixture using calcined flue gas gypsum which contains assistants and additives. The use of fatty acid salts is not described.

DE 31 05 407 A1 relates to a water-repellent gypsum mortar which comprises, for hydrophobization, a fatty amine, a salt and an alkaline metal siliconate. The publication states that salts of fatty acids in the case of gypsum have only insufficient action with regard to hydrophobization.

DE 44 33 864 A1 relates to a process for water-repellent impregnation of gypsum by treatment with organosiloxanes and alkali metal silicate. The disadvantage which in the case of use of siloxanes or silicones has already been described above.

DE 32 42 598 A1 relates to a process for producing shaped bodies, more particularly bridges, using calcium sulfate-containing binders which comprise cellulose fibers, which have been impregnated with water in a particular manner. The use of fatty acid salts is not described in the publication.

DE 41 28 424 A1 describes a process for producing water-repellent porous gypsum moldings which comprise alkylhydropolysiloxanes.

DE 697 04 312 T2 relates to a gypsum mixture which comprises a hydrophobic additive. Here too, silanes are used for hydrophobization of the gypsum powder.

DE 195 06 398 A1 relates to a process for hydrophobizing gypsum materials, in which a water-redispersible dispersion powder based on vinyl acetate copolymers with ethylene and/or vinyl esters of $C_5$-$C_{15}$-monocarboxylic acids and the like is used for hydrophobization.

DE 196 28 749 A1 describes a process for hydrophobization of a more mineral carrier and hydrophobing agent for process performance, wherein the hydrophobing agent is used as specific montan wax fraction. Overall, it is found that the prior art principally addresses the use of silicones and waxes for hydrophobization of gypsum-containing construction materials. The use of fatty acid salts is not mentioned, or is described as disadvantageous and not appropriate to the aim. The methods and hydrophobing agents described in the context of the prior art, however, all have different fundamental problems. The compounds used are generally expensive, not always available, or not available in a sufficient amount, and are frequently produced on the basis of mineral oil. All these facts have clear disadvantages by virtue of a profile of properties for such compositions which is already becoming evident at present and is to be expected in the future. The hydrophobing of gypsum materials is expensive and unreliable, and meets the demands on a bulk product from an ecological point of view only in an inadequate manner, if at all.

SUMMARY

There is therefore a need for processes for hydrophobing gypsum materials or for corresponding hydrophobed materials based on gypsum, which does not have the abovementioned disadvantages. More particularly, there was a need for hydrophobed gypsum and construction materials produced therefrom, which are available, obtainable in an ecologically acceptable manner and will be producible inexpensively for the foreseeable future.

The object underlying the present invention is achieved by binder mixtures, processes for production thereof, and construction materials based on these mixtures.

The present invention therefore provides a binder mixture comprising a mineral binder based on calcium sulfate and at least one mixture of fatty acid salts of at least two different metal cations or two different ammonium cations or a mixture of at least one metal cation and at least one ammonium cation, the metal cations being selected from the group consisting of alkali metals, alkaline earth metals, zinc, aluminum and rare earths, and the proportion of the fatty acid salts of fatty acids having 8 to 17 carbon atoms, based on the total amount of the fatty acid salts in the fatty acid salt mixture, amounting to 20% by weight or more than 20% by weight, or the proportion of fatty acids having 8 to 14 carbon atoms amounting to 10% by weight or more than 10% by weight, based on the total amount of the fatty acid salts in the fatty acid salt mixture, or both.

DETAILED DESCRIPTION

"Fatty acids" in the context of the invention refer to mono- or polycarboxylic acids having at least 6 carbon atoms, i.e. compounds which have at least one carboxyl group and branched or unbranched carbon chains. "Fatty acid salts" are understood in the context of the present text to mean salts, especially the metal salts, of the abovementioned fatty acids. The fatty acid salts are also referred to as soaps. A "fatty acid" in the inventive sense may additionally bear double bonds, hydroxyl groups or epoxy groups.

Suitable constituents of the fatty acid salt mixtures usable in accordance with the invention are the salts of the saturated fatty acids and the salts of the unsaturated fatty acids. It may be preferable to use the salts of the saturated fatty acids, but it has also been found to be advantageous in some cases to use the salts of the unsaturated fatty acids.

Suitable metal cations for formation of the fatty acid salt mixtures are especially metal cations selected from the group of the cations of alkali metals, alkaline earth metals, zinc, aluminum and rare earths.

Preferred alkali metal salts are the salts of lithium, sodium and potassium. Preferred alkaline earth metal salts are the salts of magnesium, calcium, strontium and barium. Among the salts of the rare earths, especially cerium and lanthanum are suitable.

In a preferred embodiment of the invention, the fatty acid salts are a mixture which comprises at least one fatty acid salt from the group of the alkali metal salts and at least one fatty acid salt from the group of the alkaline earth metal salts or of the salts of at least one metal from the group of the rare earths. It may be preferable when an inventive fatty acid salt mixture comprises a mixture of at least one alkali metal salt and at least one alkaline earth metal salt. For example, suitable fatty acid salt mixtures are those which comprise the sodium or potassium salts and calcium or magnesium salts of correspondingly suitable fatty acids.

In a further preferred embodiment, for example, a mixture of sodium salts and calcium salts is used. In a further preferred embodiment of the invention, the fatty acid salt mixtures comprise a mixture of about 10 to about 50% by weight of sodium salts and about 90 to about 50% by weight of calcium salts, based on the total weight of the fatty acid salts in the fatty acid salt mixture. It is particularly preferable to use sodium salts and calcium salts in a weight ratio of about 1:2.

When an inventive binder mixture comprises fatty acids of different chain length, it may be possible in principle that the metal cations are present in essentially random distribution over the fatty acids with different chain lengths. When an inventive binder mixture comprises saturated and unsaturated fatty acids, it may be possible in principle that the metal cations are present in essentially random distribution over the saturated and unsaturated fatty acids. However, it is likewise envisaged in the context of the present invention that different fatty acids, which differ, for example, in the chain length or in the saturation, have different metal cations in a statistically significant manner.

For example, it is possible in accordance with the invention that a fatty acid salt mixture present in an inventive binder comprises two or more salts of fatty acids, in which case, for example, one particular fatty acid radical in each case bears a particular metal cation, while another fatty acid radical bears another metal cation. In this case, for example, mixtures of fatty acid salts which contain a mixture of sodium cations and calcium cations may be preferable.

Suitable fatty acid salt mixtures are obtained, for example, when a fat or oil is reacted with suitable metal compounds, for example metal oxides, metal hydroxides, metal carbonates or metal salts of mineral acids, for example sodium hydroxide and calcium hydroxide.

For example, it is possible first to add a particular metal salt and then a further metal salt to the reaction mixture. The amounts of the metal salt are selected, for example, stoichiometrically with respect to the amounts of the desired salts. In a particular embodiment of the invention, the direct process product of such a reaction can be used as the fatty acid salt mixture. In this case, no further purification steps are required after the hydrolysis step.

In the context of the present invention, suitable cations in fatty acid ammonium salts suitable in accordance with the invention are in principle all compounds which lead, through appropriate conversion, to an ammonium salt of the corresponding fatty acid. Within the present text, ammonia is also referred to as "amine". In this case, ammonium salts usable in accordance with the invention can be obtained, for example, by appropriate conversion of amines or amides, such as alkylmonoamines, alkyldiamines, alkylpolyamines, dialkylamines or polyalkylamines. Suitable ammonium salts therefore derive, for example, from primary mono- or polyamino compounds having 2 to about 40, for example 6 to about 20, carbon atoms. Examples are ammonia, methylamine, ethylamine, n-propylamine, i-propylamine, n-propylamine, sec-propylamine, tert-butylamine, the isomeric pentylamines, hexylamines, heptylamines and the higher homologs thereof having 8, 9, 10, 11, 12, 13, 14, 15, 16, 17, 18, 19, 20, 21 or 22 carbon atoms, for example stearylamine, 1-aminoisobutane, substituted amines having 2 to about 20 carbon atoms, such as 2-(N,N-dimethylamino)-1-aminoethane. Suitable diamines have, for example, a molecular weight of about 32 to about 200 g/mol, where the corresponding diamines have, for example, two primary, two secondary or one primary and one secondary amino group. Examples thereof are diaminoethane, the isomeric diaminopropanes, the isomeric diaminobutanes, the isomeric diaminohexanes, piperazine, 2,5-dimethylpiperazine, amino-3-aminomethyl-3,5,5-trimethylcyclohexane (isophorone-diamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. Triethylamine, tributylamine, dimethylbenzylamine, N-ethyl-, N-methyl-, N-cyclohexylmorpholine, dimethylcyclohexylamine, dimorpholinodiethyl ether, 1,4-diazabicyclo[2.2.2]octane, 1-azabicyclo[3.3.0]-octane, N,N,N',N'-tetramethylethylenediamine, N,N,N',N'-tetramethylbutanediamine, N,N,N',N'-tetra-methylhexanediamine-1,6, pentamethyldiethylenetriamine, tetramethyldiaminoethyl ether, bis(dimethylamino-propyl)urea, N,N'-dimethylpiperazine, 1,2-dimethylimidazole or di(4-N,N-dimethylaminocyclohexyl)methane.

Likewise suitable are aliphatic amino alcohols having 2 to about 40, preferably 6 to about 20, carbon atoms, for example triethanolamine, tripropanolamine, tributanolamine, tripentanolamine, 1-amino-3,3-dimethylpentan-5-ol, 2-aminohexane-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentanemethanol, 2-amino-2-ethyl-1,3-propanediol, 2-(dimethylaminoethoxy) ethanol, aromatic-aliphatic or aromatic-cycloaliphatic amino alcohols having 6 to about 20 carbon atoms, where, as aromatic structures, heterocyclic or isocyclic ring systems such as naphthalene or especially benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol, and mixtures of two or more such compounds.

Likewise suitable as ammonium salts are, for example, compounds in which the amino group is present bonded to a substituted aromatic or heteroaromatic system, for example aminobenzoic acid, aminosalicylic acid or aminopyridinecarboxylic acid, and suitable derivatives thereof.

In a further embodiment of the invention, the proportion of the fatty acid salts having 8 to 17 carbon atoms in all of the fatty acid salts is more than 30, 50, 60, 70 or 80% by weight.

In a further embodiment of the invention, the fatty acid salt which amounts to the greatest proportion in percent by weight of all of the fatty acid salts is a salt of a fatty acid having 8 to 17 carbon atoms. It is more preferably a laurate or a myristate.

In a preferred embodiment of the invention, the mean chain length of all of the fatty acid salts present in the fatty acid salt mixture is 9 to 16 carbon atoms, especially 10 to 14 carbon atoms.

In a preferred embodiment of the invention, an inventive fatty acid salt mixture comprises fatty acid salts selected from the group consisting of fatty acid salts of caprylic acid, pelargonic acid, capric acid, lauric acid, lauroleic acid, myristic acid, myristoleic acid, palmitic acid, palmitoleic acid, margaric acid, undecylenic acid and palmitoleic acid. Further preferred fatty acids are linoleic acid and linolenic acid. Further examples of suitable fatty acids are those which have one or more OH groups or one or more epoxy groups.

In a further embodiment of the invention, the sum of the proportions of the fatty acid salts of the caprylates, laurates and myristates in all of the fatty acid salts present in the inventive fatty acid salt mixture amounts to more than 50% by weight. In a further embodiment, the proportion of the laurates is greater than 30% and especially greater than 40% by weight. In a preferred embodiment of the invention, the proportion of the stearates is less than 10% and especially less than 5%. In a further preferred embodiment, the proportion of the oleates is less than 15% and especially less than 10%. It is particularly preferred when the proportion of salts of fatty acids having 18 carbon atoms, especially of stearates and/or oleates, in the inventive hydrophobing agent is less than 25%, especially less than 15% or 10%.

In a further embodiment of the invention, the total proportion of the fatty acid salts in the inventive fatty acid salt mixture is between 5 and 95% by weight, more preferably between 10 and 90% or between 20 and 85%. In preferred embodiments, the proportion of the fatty acid salts is higher than 10%, 20% or 50%.

In a further embodiment of the invention, the fatty acid salts are hydrolysis products of a natural fat or oil. "Natural" in the context of the invention means that the fat or oil originates from a natural source. The fat or oil may, however, also be aftertreated in accordance with the invention, for example by partial or full hydrogenation or by epoxidation of double bonds. Additives may also be added to the fat or oil. Particularly suitable in accordance with the invention are natural fats or oils which contain a comparatively high proportion of fatty acids with short chain lengths. Particular preference is given in accordance with the invention to the use of coconut oil, especially of coconut oil with a high proportion of lauric acid (from 45 to 51% by weight) and myristic acid (16.5 to 18.5% by weight), which is also referred to as coconut fat or coconut butter. Likewise suitable is palm kernel fat.

The natural fats are hydrolyzed, for example, by addition of metal hydroxides.

A fatty acid salt mixture usable in accordance with the invention in a binder mixture may, in addition to the above-described fatty acid salts, also contain further ingredients. Examples are polyhydric alcohols. Polyhydric alcohols refer to compounds which have at least 2 OH groups. In principle, linear, branched, saturated or unsaturated and homocyclic or heterocyclic unsaturated alcohols are suitable as a constituent of the fatty acid salt mixtures usable in accordance with the invention. However, it has been found to be advantageous in some cases when the polyhydric alcohols used are compounds which have only carbon, hydrogen and oxygen as atomic constituents. The molar mass of corresponding polyhydric alcohols may be between about 62 (ethylene glycol) and several thousand, for example about 100 000. A fatty acid salt mixture usable in accordance with the invention may contain, for example, only one polyhydric alcohol or two or more polyhydric alcohols. The alcohols may differ, for example, in their molar masses or in the number of the OH groups or in several different features.

Suitable examples are polyhydric alcohols such as ethylene glycol, propylene glycol, butylene glycol, pentylene glycol, hexylene glycol, propanetriol, trimethylolpropane, pentaerythritol, dihydroxycyclohexane, diethylene glycol, triethylene glycol and the dimeric, trimeric or oligomeric derivatives of the abovementioned dialcohols, oligoglycerol, polyglycerol, polyvinyl alcohol and the like.

It may be preferred in accordance with the invention when a fatty acid salt mixture contains a low molecular weight polyhydric alcohol having 2, 3 or 4 OH groups, especially propanetriol.

The proportion of polyhydric alcohol or polyhydric alcohols is, when these compounds are present in the inventive fatty acid salt mixture, up to about 40% by weight, especially about 1 to about 30 or about 5 to about 20 or about 8 to about 13% by weight.

An inventive fatty acid salt mixture may further comprise one or more monoalcohols, for example fatty alcohols. Suitable alcohols here are linear or branched, saturated or unsaturated aliphatic, monofunctional alcohols, especially methanol, ethanol, the isomers of propanol, of butanol or of hexanol, and fatty alcohols having about 8 to about 22 carbon atoms, for example octanol, decanol, dodecanol, tetradecanol, hexadecanol or octadecanol be used. The fatty alcohols mentioned are obtainable, for example, by reduction of natural fatty acids and can be used either as pure substances or in the form of the technical-grade mixtures thereof. Very suitable examples are linear monoalcohols and especially those having about 4 to about 18 carbon atoms. Instead of the linear or branched aliphatic alcohols or in a blend therewith, monoalkyl polyether alcohols of different molecular weight are also useable, preferably in the molecular weight ranges of about 1000 to about 2000.

The fatty acid salt mixture which can be used according to the invention can in principle be used for any purposes. However, it has been found in the context of the present invention that the fatty acid salt mixture has excellent suitability for imparting particular properties to construction materials with regard to the interaction thereof with water, more particularly for hydrophobizing these construction materials. A fatty acid salt mixture which can be used according to the invention is thus suitable as a hydrophobing agent. When reference is made to hydrophobing agents in the context of the present text, this should also be understood as a reference to the fatty acid salt mixtures which can be used according to the invention.

In a further embodiment of the invention, the fatty acid salt mixture comprises additives. Suitable additives are, for example, solvents, binders, solubilizers, fillers, further hydrophobing agents, surfactants, emulsifiers, viscosity improvers, pigments, dyes, preservatives, gelating agents, anticaking agents, pH modifiers, buffers, reaction accelerants, reaction retardants, colloids, polymers or air entrainers, or mixtures of two or more thereof.

A fatty acid salt mixture which can be used according to the invention may additionally comprise, for example, binders, surfactants, emulsifiers, colloids or polymers. These additives are present, for example, in order to improve the dispersibility and miscibility of the fatty acid salt mixture with a further material, especially a construction material. Appropriate additives useable in accordance with the invention are fatty acid derivatives, such as esters, waxes, polymers, especially ionic polymers and detergents.

In a further embodiment of the invention, an inventive composition comprises one or more surfactants. Examples of suitable surfactants include anionic surfactants, nonionic surfactants or cationic surfactants. It has been found in some cases that the presence of surfactants lowers the amount of hydrophobing agent required to achieve a desired hydrophobing effect. This does not correspond to expectation on addition of a hydrophilic substance and is, without wishing to be bound to a particular theory, possibly attributable to improved distribution of the hydrophobing agent in the composition.

In a further embodiment of the invention, an inventive binder mixture (also called "composition" herinafter) comprises one or more surfactants or emulsifiers. Examples of suitable surfactants or emulsifiers include anionic surfactants, nonionic surfactants or cationic surfactants. It has been found in some cases that the presence of surfactants lowers the amount of hydrophobing agent required to achieve a desired hydrophobing effect. This does not correspond to expectation on addition of a hydrophilic substance and is, without wishing to be bound to a particular theory, possibly attributable to improved distribution of the hydrophobing agent in the composition.

Typical examples of anionic surfactants suitable in the context of the inventive binder mixtures are soaps, alkylbenzenesulfonates, secondary alkanesulfonates, olefinsulfonates, alkyl ether sulfonates, glyceryl ether sulfonates, α-methyl ester sulfonates, sulfo fatty acids, alkyl and/or alkenyl sulfates, alkyl ether sulfates, glyceryl ether sulfates, hydroxy mixed ether sulfates, fatty alcohol (ether) phosphates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acylamino acids, for example acyl lactylates, acyl tartrates, acyl glutamates and acyl aspartates, alkyloligoglucoside sulfates, protein fatty acid condensates (especially wheat-based vegetable products) and alkyl (ether) phosphates. When the anionic surfactants contain polyglycol ether chains, they may have a conventional, but preferably a narrowed, homolog distribution.

Preference is given to anionic surfactants selected from the group formed by alkyl and/or alkenyl sulfates, alkyl ether sulfates, alkylbenzenesulfonates, soaps, monoglyceride (ether) sulfates and alkanesulfonates, especially fatty alcohol sulfates, fatty alcohol ether sulfates, secondary alkanesulfonates and linear alkylbenzenesulfonates.

Alkyl and/or alkenyl sulfates, which are also frequently referred to as fatty alcohol sulfates, are understood to mean the sulfation products of primary alcohols. Typical examples of alkyl sulfates which may find use in the context of the invention are the sulfation products of caproyl alcohol, caprylyl alcohol, capryl alcohol, 2-ethylhexyl alcohol, lauryl alcohol, myristyl alcohol, cetyl alcohol, palmoleyl alcohol, stearyl alcohol, isostearyl alcohol, oleyl alcohol, elaidyl alcohol petroselinyl alcohol, arachyl alcohol, gadoleyl alcohol, behenyl alcohol and erucyl alcohol, and the technical-grade mixtures thereof, which are obtained by high-pressure hydrogenation of technical-grade methyl ester fractions or aldehydes from the Roelen oxo process. The sulfation products can preferably be used in the form of the alkali metal salts and more particularly the sodium salts thereof. Particular preference is given to alkyl sulfates based on $C_{16/18}$ tallow fatty alcohols or vegetable fatty alcohols of comparable carbon chain distribution, in the form of the sodium salts thereof.

Alkyl ether sulfates ("ether sulfates") are known anionic surfactants which are prepared on the industrial scale by $SO_3$ sulfation or chlorosulfonic acid (CSA) sulfation of fatty alcohol polyglycol ethers or oxo alcohol polyglycol ethers, and subsequent neutralization. Typical examples are the sulfates of addition products of an average of 1 to 10 mol and especially 2 to 5 mol of ethylene oxide onto caproyl alcohol, caprylyl alcohol, 2-ethylhexyl alcohol, capryl alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol and brassidyl alcohol, and the technical-grade mixtures thereof in the form of the sodium and/or magnesium salts thereof. The ether sulfates may have either a conventional or a narrowed homolog distribution. Particular preference is given to the use of ether sulfates based on adducts of an average of 2 to 3 mol of ethylene oxide on technical-grade $C_{12/14}$ or $C_{12/18}$ coconut fatty alcohol fractions in the form of the sodium and/or magnesium salts thereof.

The alkylbenzenesulfonates used may, for example, be dodecylbenzenesulfonates, tetradecylbenzenesulfonates, hexadecylbenzenesulfonates, and the technical-grade mixtures thereof in the form of the sodium salts.

Soaps are finally understood to mean fatty acid salts of the linear or branched, saturated or unsaturated carboxylic acids having 6 to 22 and preferably 12 to 18 carbon atoms, where the cation present may, for example, be an alkali metal and/or alkaline earth metal, ammonium, alkylammonium or alkanolammonium ion. The soaps mentioned here should be understood as an addition to any fatty acid salts present in the inventive mixture, and the optional list given here does not affect information regarding fatty acid salts whose presence in the inventive composition is obligatory. When information regarding optionally present fatty acid salts contradicts information regarding obligatorily present fatty acid salts, the information regarding the obligatorily present fatty acid salts takes precedence in each case. This is true, for example, for substance information, and likewise for quantitative information.

Typical examples are the sodium, potassium, magnesium, ammonium and triethanolammonium salts of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, eleostearic acid, arachic acid, gadoleic acid, behenic acid and erucic acid, and the technical-grade mixtures thereof. For example, coconut fatty acid or palm kernel fatty acid are used in the form of the sodium or potassium salts thereof.

Monoglyceride sulfates and monoglyceride ether sulfates are known anionic surfactants which can be obtained by the appropriate methods of preparative organic chemistry. Typically, they are prepared proceeding from triglycerides which, optionally after ethoxylation, are transesterified to the monoglycerides and then sulfated and neutralized. It is likewise possible to react the partial glycerides with suitable sulfating agents, preferably gaseous sulfur trioxide or chlorosulfonic acid. Typical examples of monoglyceride (ether) sulfates suitable in the context of the invention are the reaction products of lauric acid monoglyceride, coconut fatty acid monoglyceride, palmitic acid monoglyceride, stearic acid monoglyceride, oleic acid monoglyceride and tallow fatty acid monoglyceride, and the ethylene oxide adducts thereof with sulfur trioxide or chlorosulfonic acid in the form of the sodium salts thereof.

The inventive binder mixtures may contain nonionic surfactants as surfactants or as emulsifiers. Typical examples of nonionic surfactants are alkoxylates of alkanols, endgroup-capped alkoxylates of alkanols with no free OH groups, alkoxylated fatty acid lower alkyl esters, hydroxy mixed ethers, alkylphenol polyglycol ethers, fatty acid polyglycol esters, fatty acid amide polyglycol ethers, fatty amine polyglycol ethers, alkoxylated triglycerides, mixed ethers or mixed formals, alk(en)yl oligoglycosides, fatty acid N-alkylglucamides, protein hydrolyzates (especially wheat-based vegetable products), polyol fatty acid esters, sugar esters, sorbitan esters, polysorbates and amine oxides. When the nonionic surfactants contain polyglycol ether chains, they may have a conventional, but preferably a narrowed, homolog distribution.

Suitable examples are the nonionic surfactants selected from the group formed by alkyl and/or alkenyl oligoglycosides, hydroxy mixed ethers, alkoxylates of alkanols, especially fatty alcohol polyethylene glycol/polypropylene glycol ethers (FAEO/PO) or fatty alcohol polypropylene glycol/polyethylene glycol ethers (FAPO/EO), endgroup-capped alkoxylates of alkanols, especially endgroup-capped fatty alcohol polyethylene glycol/polypropylene glycol ethers or endgroup-capped fatty alcohol polypropylene glycol/polyethylene glycol ethers, and fatty acid lower alkyl esters and amine oxides.

Likewise suitable are the alkyl and/or alkenyl oligoglycosides. The alkyl and/or alkenyl oligoglycosides may derive from aldoses or ketoses having 5 or 6 carbon atoms, preferably from glucose. The preferred alkyl and/or alkenyl oligoglycosides are therefore alkyl and/or alkenyl oligoglucosides. The degree of oligomerization p, i.e. the distribution of mono- and oligoglycosides, is, for example, between 1 and 10. While p in a given compound must always be an integer and here may in particular assume the values of p=1 to 6, the value p for a particular alkyl oligoglycoside is an analytically determined theoretical parameter which is usually a fraction. Preference is given to using alkyl and/or alkenyl oligoglycosides with a mean degree of oligomerization p of 1.1 to 3.0. From a performance point of view, preference is given to those alkyl and/or alkenyl oligoglycosides with a degree of oligomerization less than 1.7 and especially between 1.2 and 1.4. The alkyl or alkenyl radical may derive from primary alcohols having 4 to 11 and preferably 8 to 10 carbon atoms. Typical examples are butanol, caproyl alcohol, caprylyl alcohol, capryl alcohol and undecyl alcohol, and the technical-grade mixtures thereof, as obtained, for example, in the hydrogenation of technical-grade fatty acid methyl esters or in the course of the hydrogenation of aldehydes from the Roelen oxo process.

The alkyl or alkenyl radical may also derive from primary alcohols having 12 to 22 and preferably 12 to 14 carbon atoms. Typical examples are lauryl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, brassidyl alcohol and the technical-grade mixtures thereof, which can be obtained as described above.

Further suitable constituents of the inventive binder mixtures are hydroxy mixed ethers, which derive, for example, from alkoxylates of monohydric aliphatic, saturated, straight-chain or branched alcohols having 4 to 18 carbon atoms.

Examples of suitable straight-chain alcohols are butanol-1, caproyl alcohol, enanthyl alcohol, caprylyl alcohol, pelargonyl alcohol, capryl alcohol, undecanol-1, lauryl alcohol, tridecanol-1, myristyl alcohol, pentadecanol-1, palmityl alcohol, heptadecanol-1, stearyl alcohol, nonadecanol-1, arachidyl alcohol, heneicosanol-1, behenyl alcohol and the technical-grade mixtures thereof, as obtained in the high-pressure hydrogenation of technical-grade methyl esters based on fats and oils. Examples of such branched alcohols are what are known as the oxo process alcohols, which usually bear 2 to 4 methyl groups as branches and are prepared by the oxo process, and what are known as Guerbet alcohols which are 2-branched with an alkyl group. Suitable Guerbet alcohols are 2-ethylhexanol, 2-butyloctanol, 2-hexyldecanol and/or 2-octyldodecanol.

The alcohols can be used, for example, in the form of their alkoxylates, which are prepared in a known manner by reacting the alcohols in any sequence with ethylene oxide, propylene oxide and/or butylene oxide.

Likewise suitable are fatty alcohol polyethylene glycol/polypropylene glycol ethers or fatty alcohol polypropylene glycol/polyethylene glycol ethers, which are optionally endgroup-capped. For example, the fatty alcohol radical is an aliphatic, saturated, straight-chain or branched alkyl radical having 8 to 16 carbon atoms. The fatty alcohol polyethylene glycol/polypropylene glycol ethers or fatty alcohol polypropylene glycol/polyethylene glycol ethers useable in accordance with the invention are, for example, addition products of 1 to 20 mol of ethylene oxide onto monofunctional alcohols. Suitable alcohols are the above-described alcohols such as fatty alcohols, oxo process alcohols and Guerbet alcohols. Among such alcohol ethoxylates, those which have a narrowed homolog distribution are likewise suitable.

The endgroup-capped compounds are capped, for example, by an alkyl group having 1 to 8 carbon atoms. Frequently, such compounds are also referred to in the literature as mixed ethers. Suitable representatives are methyl group-capped compounds. Such compounds can be prepared easily by reacting the corresponding non-endgroup-capped fatty alcohol polyethylene glycol/polypropylene glycol ethers with methyl chloride in the presence of a base.

Likewise suitable as surfactants or emulsifiers in the context of the inventive compositions are alkoxylated fatty acid lower alkyl esters. Typical examples are the formal insertion products of an average of 1 to 20 and preferably 5 to 10 mol of ethylene oxide and/or propylene oxide into the methyl, ethyl, propyl, isopropyl, butyl and tert-butyl esters of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, eleostearic acid, arachic acid, gadoleic acid, behenic acid and erucic acid, and the technical-grade mixtures thereof. The products are typically prepared by inserting the alkoxides into the carbonyl ester bond in the presence of specific catalysts, for example calcined hydrotalcite. Particular preference is given to reaction products of an average of 5 to 10 mol of ethylene oxide into the ester bond of technical-grade coconut fatty acid methyl esters.

Likewise suitable as surfactants or emulsifiers in the context of the inventive compositions are amine oxides or alkylamidoamine oxides.

An inventive binder mixture may additionally also comprise one or more cationic surfactants. Suitable cationic surfactants are especially those which contain a quaternary ammonium group. They may be cationic or amphoteric betaine surfactants. Suitable cationic surfactants contain amino groups or quaternized hydrophilic ammonium groups which, in solution, bear a positive charge and can be represented by the general formula $N^{(+)}R^1R^2R^3R^4X^{(-)}$ where $R^1$ to $R^4$ are each independently aliphatic groups, aromatic groups, alkoxy groups, polyoxyalkylene groups, alkylamido groups, hydroxyalkyl groups, aryl groups or alkaryl groups each having 1 to 22 carbon atoms, and $X(-)$ is a cosmetically compatible anion selected from halogen, acetate, phosphate, nitrate or alkylsulfate, preferably a chloride.

In order to ensure the surfactant properties, at least one of the $R^1$ to $R^4$ radicals has at least 8 carbon atoms. In addition to the carbon atoms and the hydrogen atoms, the aliphatic groups may also contain cross-bonds or other groups, for example further amino groups. Examples of suitable cationic surfactants are especially quaternary ammonium compounds, preference being given to ammonium halides, especially the chlorides or bromides thereof, such as alkyldimethylbenzylammonium salts, alkyltrimethylammonium salts, dialkyldimethylammonium chlorides and trialkylmethylammonium chlorides or the bromides thereof, for example cetyltrimethylammonium chloride or bromide, stearyltrimethylammonium chloride or bromide, distearyltrimethylammonium chloride or bromide, lauryldimethylbenzylammonium chloride or bromide, tetradecyltrimethylammonium chloride or bromide, alkyldimethylhydroxyethylammonium chloride or bromide, alkyltrimethylammonium chloride or bromide, dialkyldimethylammonium chloride or bromide, alkylpyridinium salts, for example lauryl- or cetylpyridinium chloride, alkylamidoethyltrimethylammonium ether sulfates, and compounds with cationic character, such as amine oxides, for example alkylmethylamine oxides or alkylaminoethyldimethylamine oxides.

In a preferred embodiment, the inventive compositions contain 0 to about 50% by weight, for example about 0 to about 50 or about 1 to about 30 or about 2 to about 25 or about 3 to about 22 or about 4 to about 20 or about 5 to about 15 or about 7 to about 13 or about 8 to about 12, for example about 9 to about 11 or about 10% by weight, of anionic, cationic or nonionic surfactants, or mixtures of two or more thereof, for example a mixture of one or more anionic surfactants and one or more nonionic surfactants or one or more cationic surfactants or one or more nonionic surfactants, calculated as active substance, based on the overall composition.

Solvents are present in the fatty acid salt mixture, for example, when it is to be used as a liquid composition. Suitable solvents are, for example, water or organic solvents such as alcohols, for example ethanol.

The binders used are, for example, water-soluble or water-dispersible binders. Such substances are known in the literature. Preference is given to using substances which have a waxy, highly viscous or solid consistency at room temperature, i.e. between 20 and 25° C., and which have a melting point of 25° C. to 150° C. Examples of customary corresponding binding materials are polyvinyl alcohol, methylcellulose, carboxymethylcellulose, ethoxylated fatty alcohols or mixtures thereof. In addition, it is possible to use fatty acid esters or film-forming polymers. The binding materials should disrupt the hydration process of the construction material to a minimum degree, if at all, when water is introduced.

Preferred colloids are partly hydrolyzed and fully hydrolyzed polyvinyl alcohols; polyvinylpyrrolidones, polyvinyl acetals, polysaccharides in water-soluble form, such as starches (amylose and amylopectin), celluloses and the carboxymethyl, methyl, hydroxyethyl, hydroxypropyl derivatives thereof, proteins such as casein or caseinate, soy protein, gelatin, lignosulfonates, synthetic polymers such as poly (meth)acrylic acid, copolymers of (meth)acrylates with carboxyl-functional comonomer units, poly(meth)acrylamide, polyvinylsulfonic acids and the water-soluble copolymers thereof; melamine formaldehydesulfonates, naphthalene formaldehydesulfonates, styrene-maleic acid and vinyl ether-maleic acid copolymers. The proportion of colloids is preferably between 20 and 80% by weight, especially between 50 and 60%. Preferably at least 2, 5 or 10%, and not more than 20, 50 or 80%, of colloids is present.

The colloids used are preferably partly hydrolyzed or fully hydrolyzed polyvinyl alcohols with a degree of hydrolysis of 80 to 100 mol %, especially of 80 to 95 mol %, and a Höppler viscosity (in 4% aqueous solution) of 1 to 30 mPas, preferably 3 to 15 mPas (method according to Höppler at 20° C., DIN 53015). Preference is also given to partly hydrolyzed or fully hydrolyzed, hydrophobically modified polyvinyl alcohols with a degree of hydrolysis of 80 to 100 mol % and a Höppler viscosity in 4% aqueous solution of 1 to 30 mPas, preferably 3 to 15 mPas. Examples thereof are partly hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 to 11 carbon atoms, dialkyl maleates and dialkyl fumarates such as diisopropyl maleate and diisopropyl fumarate, vinyl chloride, vinyl alkyl ethers such as vinyl butyl ether, alpha-olefins having 2 to 12 carbon atoms, such as ethene, propene and decene. The proportion of the hydrophobic units is preferably 0.1 to 10% by weight, based on the total weight of the partly or fully hydrolyzed polyvinyl alcohol. Particular preference is given to partly hydrolyzed or fully hydrolyzed copolymers of vinyl acetate with isopropenyl acetate having a degree of hydrolysis of 95 to 100 mol %. It is also possible to use mixtures of the polyvinyl alcohols mentioned.

Particularly preferred polymers are those which are redispersible in water. Suitable polymers are those based on one or more monomers from the group comprising vinyl esters of unbranched or branched alkylcarboxylic acids having 1 to 15 carbon atoms, methacrylic esters and acrylic esters of alcohols having 1 to 15 carbon atoms, vinylaromatics, olefins, dienes and vinyl halides. Further suitable polymers are specified in WO 2004/103928 on pages 8 to 10, to which explicit reference is made here.

To increase the storability, an antiblocking agent (anticaking agent) can be added. Examples of antiblocking agents are calcium and magnesium carbonate, tallow, silica, kaolins, silicates, preferably with particle sizes in the range between 10 nm and 100 μm. The proportion of the antiblocking agents in the inventive hydrophobing agent is, in preferred embodiments, between 0.5 and 30% and especially between 1 and 20% by weight. Preferably up to 5, 10 or 20% by weight of antiblocking agent is present.

Fillers preferred in accordance with the invention are mineral or inorganic fillers, for example clays, sand, grit, slag, glass, silica gels, sulfates, oxides, glass and mineral fibers, polymer fibers, hollow microspheres, light organic fillers (for example polystyrene foam), paper powder, wood shavings and cellulose fibers. The fillers may be part of the inventive fatty acid salt mixture.

Further additives used may, for example, be organo(poly)siloxanes. Corresponding materials are disclosed in DE 601 08 152 T2, especially in paragraphs [0015] to [0017], to which explicit reference is made here.

Viscosity improvers serve, for example, to alter the flow properties or the processability of a fatty acid salt mixture. Additives which alter the flow behavior of the render are also referred to as rheology-altering additives.

The pigments used may, for example, be titanium dioxide, zinc oxide or zinc sulfide.

An inventive binder mixture comprises at least one mineral binder based on calcium sulfate. The mineral binder based on calcium sulfate is preferably a form of such a mineral binder which can be considered to be gypsum in the widest sense. Suitable examples in this context are in principle all kinds and forms of gypsum which can originate, for example, from natural deposits, from synthetic sources or from the cleaning of flue gases, what is known as flue gas gypsum.

A corresponding inventive binder mixture can be used especially to produce construction materials such as gypsum moldings, for example gypsum plasterboard. In the case of production of slabs and moldings based on gypsum, the procedure is typically to mix the hemihydrate, at least β-hemihydrate or a mixture of β- and α-hemihydrate, with water, and use this plastic slurry to form a corresponding molding or a slab. The binder is provided in a known manner with appropriate boards, which ultimately leads to the frequently used plasterboard.

An inventive binder mixture may be present, for example, as a granule, powder, solution, dispersion or emulsion. It is preferred in some cases when the inventive fatty acid salt mixture is provided, for example, in the form of a granule. Such a granulated fatty acid salt mixture can be prepared by customary or known granulation processes. In a particularly preferred embodiment of the invention, the fatty acid salt mixture is a granule which contains at least the following components 40 to 95% by weight of fatty acid salts,
1 to 20% by weight of at least one mono- or polyhydric alcohol
10 to 50% by weight of a water-soluble or water-dispersible binder
0 to 60% by weight of at least one emulsifier and
0 to 30% by weight of further additives.

In a further embodiment of the invention, the inventive fatty acid salt mixture can be used as a powder. Such powders can be applied to the surface of the grains of the construction material, for example, by mixing with a construction material, for example a mortar.

The invention accordingly also provides a construction material which comprises an inventive binder mixture. The construction material is preferably a gypsum molding, gypsum slab or gypsum plasterboard.

The preferred proportion of the hydrophobing agent in the construction material is preferably between 0.01 and 5% by weight, more preferably between 0.2 and 3% by weight and between 0.5 and 1% by weight. In particularly preferred embodiments, at least 0.01, 0.02 or 0.5% by weight and/or up to 0.5, 1 or 2% by weight of the hydrophobing agent is present.

The invention also provides a hydrophobed component, obtainable by a process in which an inventive binder mixture is set.

In a preferred embodiment, fatty acid salts selected from the group consisting of fatty acid salts of caprylic acid, pelargonic acid, capric acid, lauric acid, myristic acid, palmitic acid, margaric acid, undecylenic acid and palmitoleic acid, and the cleavage products of castor oil or of further hydroxy fatty acids are used. In a preferred embodiment, the sum of the proportions of the fatty acid salts of caprylic acid, lauric acid and myristic acid in all of the fatty acid salts amount to more than 50% by weight. In a further preferred embodiment of the invention, the fatty acid salts are hydrolysis products or oxidation products of a natural fat.

The invention also relates to a process for preparing a binder mixture, in which, as the reactant, a fatty acid mixture or a mixture of fatty acid esters or a mixture of fatty acids and fatty acid esters, the proportion of the fatty acid salts of fatty acids having 8 to 17 carbon atoms, based on the total amount of the fatty acid salts in the fatty acid salt mixture, amounting to 20% by weight or more than 20% by weight, or the proportion of fatty acids having 8 to 14 carbon atoms amounting to 10% by weight or more than 10% by weight, based on the total amount of the fatty acid salts in the fatty acid salt mixture, or both, is admixed simultaneously or successively with at least two metal compounds of metals from the group of the alkali metals, alkaline earth metals, zinc, aluminum or the rare earths, which are capable of salt formation with fatty acids under the process conditions selected, or at least two amino compounds which are capable of ammonium salt formation with fatty acids under the process conditions selected, such that the product formed is a mixture of fatty acid salts having at least two different metal cations or two different ammonium cations, or a mixture of at least one metal cation and at least one ammonium cation, the metal cations being selected from the group consisting of alkali metals, alkaline earth metals, zinc, aluminum and rare earths, and the proportion of the fatty acid salts of fatty acids having 8 to 17 carbon atoms, based on the total amount of the fatty acid salts in the fatty acid salt mixture, amounting to 20% by weight or more than 20% by weight, or the proportion of fatty acids having 8 to 14 carbon atoms amounting to more than 10% by weight, based on the total amount of the fatty acid salts in the fatty acid salt mixture, or both, and this product is admixed with a mineral binder based on calcium sulfate.

For example, the metal compounds of metals from the group of the alkali metals, alkaline earth metals, zinc, aluminum or the rare earths, which are capable of salt formation with fatty acids under the process conditions selected, are basic compounds, especially compounds from the group of the oxides, hydroxides, carbonates.

For example, the compounds used of metals from the group of the alkali metals, alkaline earth metals, zinc, aluminum or the rare earths, or the ammonium compounds used, which are capable of salt formation with fatty acids under the process conditions selected, may be calcium hydroxide, sodium hydroxide, potassium hydroxide or ammonium hydroxide.

The reactant used is, for example, a mixture of fatty acid esters, especially of triglycerides. The process according to the invention is particularly suitable when the mixture of fatty acid esters used is a natural fat or oil.

The process according to the invention can, for example, also be performed by using the at least two compounds of metals from the group of the alkali metals, alkaline earth metals, zinc, aluminum or the rare earths, or amino compounds which are capable of salt formation with fatty acids under the process conditions selected, in an amount of 5 to 95% by weight, based on the weight of the fatty acid mixture or of the mixture of fatty acid esters or of the mixture of fatty acids and fatty acid esters.

In further preferred embodiments, additives are present, as described above for the inventive fatty acid salt mixtures. Particular preference is given to solvents, solubilizers, fillers, further hydrophobing agents, further mineral or non-mineral binders, surfactants, emulsifiers, viscosity improvers, surfactants, pigments, dyes, preservatives, gelating agents, anticaking agents, pH modifiers, buffers, reaction accelerants, reaction retardants, colloids, polymers and/or air entrainers is present. In preferred embodiments, use is effected as granules, powder, solution, dispersion, suspension or emulsion.

The invention claimed is:

1. A binder mixture comprising calcium sulfate and at least one mixture of fatty acid salts of at least two different metal cations or two different ammonium cations or a mixture of at least one metal cation and at least one ammonium cation, the metal cations being selected from the group consisting of alkali metals, alkaline earth metals, zinc, aluminum and rare earths, wherein the proportion of the fatty acid salts of fatty acids having 8 to 17 carbon atoms, based on the total amount of the fatty acid salts in the fatty acid salt mixture, amounts to 20% by weight or more than 20% by weight, or the proportion of fatty acids having 8 to 14 carbon atoms amounts to 10% by weight or more than 10% by weight, based on the total amount of the fatty acid salts in the fatty acid salt mixture, or both.

2. The binder mixture as claimed in claim 1, wherein at least one fatty acid salt contains one of the metals sodium, potassium, zinc, magnesium or calcium.

3. The binder mixture as claimed in claim 1, further comprising a polyhydric alcohol.

4. The binder mixture as claimed in claim 1, further comprising at least one additive selected from the group consisting of solvents, binders, polymers, colloids, surfactants, emulsifiers or solvents, or a mixture of two or more thereof.

5. The binder mixture as claimed in claim 1, wherein the proportion of the fatty acid salts of fatty acids having 8 to 17 carbon atoms, based on the total amount of the fatty acid salts in the binder mixture, amounts to 20% by weight or more than 20% by weight.

6. The binder mixture as claimed in claim 1, wherein the fatty acid salt which amounts to the greatest proportion in percent by weight of all of the fatty acid salts is a salt of a fatty acid having 8 to 17 carbon atoms.

7. The binder mixture as claimed in claim 1, wherein the average chain length of all of the fatty acid salts in the binder mixture is within a range from 12 to 16 carbon atoms.

8. The binder mixture as claimed in claim 1, wherein the fatty acid salts are selected from the group consisting of fatty acid salts of caprylic acid, pelargonic acid, capric acid, lauric acid, myristic acid, palmitic acid, margaric acid, undecylenic acid, palmitoleic acid, and mixtures thereof.

9. The binder mixture as claimed in claim 1, wherein that the sum of the proportions of the salts of fatty acids having more than 12 to 16 carbon atoms in the fatty acid radical in all of the fatty acid salts amounts to more than 50% by weight.

10. The binder mixture as claimed in claim 1, wherein the total proportion of the fatty acid salts in the binder mixture is between 5 and 95% by weight.

11. The binder mixture as claimed in claim 1, wherein the fatty acid salts include hydrolysis products of a natural fat or oil.

12. The binder mixture as claimed in claim 1, having the following composition:
 5 to 95% by weight of fatty acid salts,
 5 to 50% by weight of mono or polyhydric alcohols,
 0 to 60% by weight of surfactants or emulsifiers,
 0 to 30% by weight of antiblocking agents,
 0 to 30% by weight of binders,
 0 to 50% by weight of solvents, and
 0 to 30% by weight of polymers.

13. The binder mixture as claimed in claim 1, in the form of a granule, a powder, a solution, a dispersion or an emulsion.

14. A gypsum plasterboard comprising a binder mixture as claimed in claim 1.

15. The gypsum plasterboard as claimed in claim 14, further comprising at least one of solvents, solubilizers, fillers, further hydrophobing agents, binders, surfactants, emulsifiers, viscosity improvers, surfactants, pigments, dyes, preservatives, gelating agents, anticaking agents, pH modifiers, buffers, reaction accelerants, reaction retardants, colloids, polymers and/or air entrainers.

16. A hydrophobed component produced by setting a binder mixture as claimed in claim 1.

17. A process for preparing a binder mixture, comprising mixing simultaneously or successively:
 as the reactant, a fatty acid mixture, a mixture of fatty acid esters or a mixture of fatty acids and fatty acid esters, the proportion of the fatty acid salts of fatty acids having 8 to 17 carbon atoms, based on the total amount of the fatty acid salts in the fatty acid salt mixture, in the fatty acid mixture or the mixture of fatty acid esters amounting to 20% by weight or more than 20% by weight, or the proportion of fatty acids having 8 to 14 carbon atoms amounting to 10% by weight or more than 10% by weight, based on the total amount of the fatty acid salts in the fatty acid salt mixture, or both; and
 at least two compounds that form salt with fatty acids selected from the group consisting of at least two metal compounds selected from the group consisting of the alkali metals, alkaline earth metals, zinc, aluminum or the rare earths, and mixtures thereof, at least two ammonium compounds, or at least one metal compound selected from the group consisting of the alkali metals, alkaline earth metals, zinc, aluminum or the rare earths, and mixtures thereof and at least one ammonium compound,
 such that the resultant product formed is a mixture of fatty acid salts of at least two different metals selected from the group consisting of alkali metals, alkaline earth metals, zinc, aluminum and rare earths, at least two different ammonium compounds, or a mixture of at least one metal compound and at least one ammonium compound, wherein the proportion of fatty acid salts of fatty acids having 8 to 17 carbon atoms, based on the total amount of the fatty acid salts in the binder mixture, amounts to 20% by weight or more than 20% by weight, or the proportion of fatty acids having 8 to 14 carbon atoms amounts to 10% by weight or more than 10% by weight, based on the total amount of the fatty acid salts in the fatty acid salt mixture, or both; and
 then mixing the resultant product with a mineral binder comprising calcium sulfate to produce the binder mixture.

18. The process as claimed in claim 17, wherein the at least two metal compounds selected from the group consisting of the alkali metals, alkaline earth metals, zinc, aluminum or the rare earths, include basic compounds, and mixtures thereof.

19. The process as claimed in claim 17, wherein the metal compound selected from the group consisting of the alkali metals, alkaline earth metals, zinc, aluminum or the rare earths includes calcium hydroxide, sodium hydroxide, potassium hydroxide, or mixtures thereof.

20. The process as claimed in claim 17, wherein the reactant is a mixture of fatty acid esters.

21. The process as claimed in claim 20 wherein the mixture of fatty acid esters includes a natural fat or oil.

22. The process as claimed in claim 17, wherein the at least two metal compounds selected from the group consisting of the alkali metals, alkaline earth metals, zinc, aluminum or the rare earths, and mixtures thereof are used in an amount of 1% to 50% by weight, based on the weight of the fatty acid mixture, the mixture of fatty acid esters, or the mixture of fatty acids and fatty acid esters.

23. A binder mixture comprising a mineral binder comprising calcium sulfate and at least one salt of a fatty acid, said salt being soluble in ethanol at a temperature below the boiling point of ethanol.

24. The binder mixture as claimed in claim 23, wherein the at least one salt of a fatty acid includes at least one salt of a fatty acid bearing at least one hydroxyl group.

25. The binder mixture as claimed in claim 23, wherein the at least one salt of a fatty acid includes at least one salt of ricinoleic acid.

26. The binder mixture as claimed in claim 23, further comprising at least one additive.

27. The binder mixture as claimed in claim 23, further comprising a polyhydric alcohol.

28. The binder mixture as claimed in claim 26, wherein the at least one additive is selected from the group consisting of solvents, binders, polymers, colloids, surfactants, emulsifiers or solvents, or a mixture of two or more thereof.

29. The process as claimed in claim 18, wherein the basic compounds are selected from the group consisting of oxides, hydroxides, carbonates, and mixtures thereof.

* * * * *